United States Patent [19]
Martin

[11] 3,910,120
[45] Oct. 7, 1975

[54] PRESSURE GAUGE HAVING INTERCHANGEABLE INDICATOR COMPONENTS AND POSITIVE PISTON STOP

[75] Inventor: Clyde J. Martin, Cincinnati, Ohio

[73] Assignee: Martin Industries, Inc., Cincinnati, Ohio

[22] Filed: Mar. 20, 1974

[21] Appl. No.: 452,791

[52] U.S. Cl. ................ 73/419; 73/146.3; 73/146.8
[51] Int. Cl.² ........................................... G01L 7/16
[58] Field of Search ................ 73/419, 146.3, 146.8

[56] References Cited
UNITED STATES PATENTS

| | | | |
|---|---|---|---|
| 1,806,380 | 5/1931 | Arnold | 73/419 |
| 2,038,928 | 4/1936 | Farley et al. | 73/419 |
| 2,596,856 | 5/1952 | Krohn, Jr. | 73/419 |
| 3,286,726 | 11/1966 | Guy | 73/419 |
| 3,289,480 | 12/1966 | Sams | 73/419 |

Primary Examiner—Donald O. Woodiel
Attorney, Agent, or Firm—J. Warren Kinney, Jr.

[57] ABSTRACT

The pressure gauge comprises an elongate body having an axial bore therethrough for slidably carrying a piston which is constantly urged toward a fully retracted position by a compression spring. The piston includes an end portion which projects beyond one end of the bore when the piston is in an advanced position due to the force of a fluid pressure acting against the other end thereof. Means securely though releasably close the other end of the bore, retaining the piston and spring therein. The closing means includes a passageway therethrough in open communication with the interior of the bore, permitting access to a source of fluid pressure to be measured. A shoulder spaced inwardly from one end of the axial bore provides an abutment for a shoulder intermediate the length of the piston, providing a positive stop for limiting movement of the piston relative to the elongate body.

8 Claims, 6 Drawing Figures

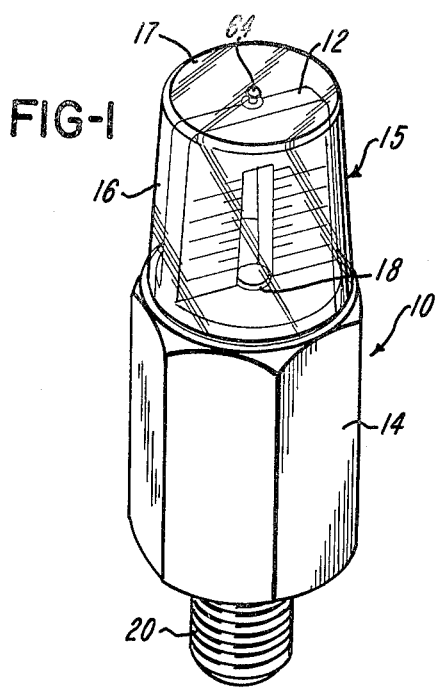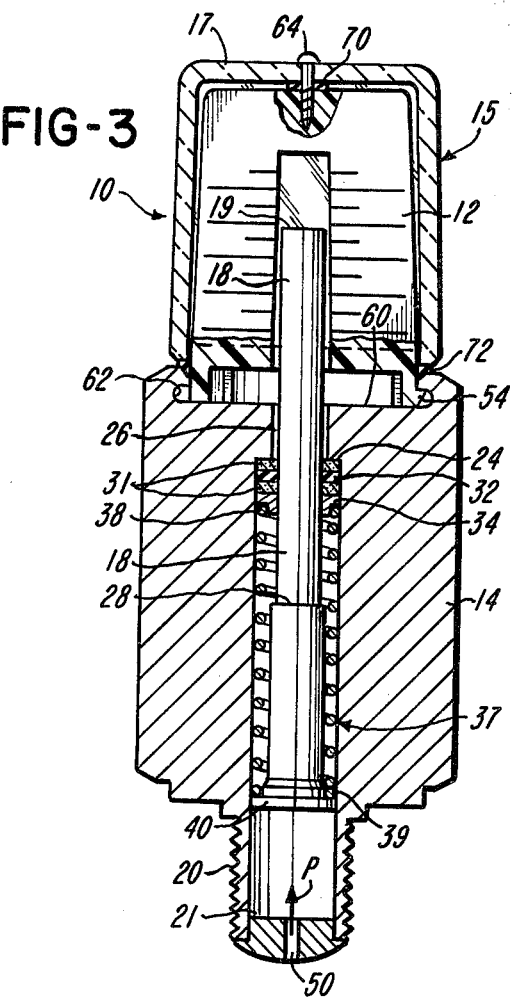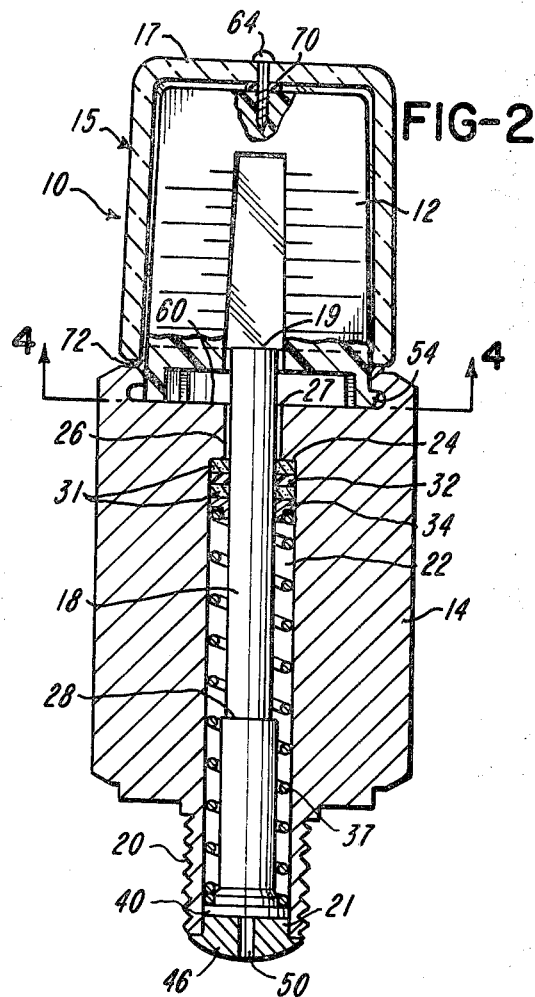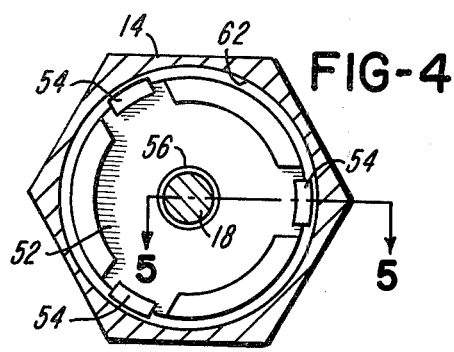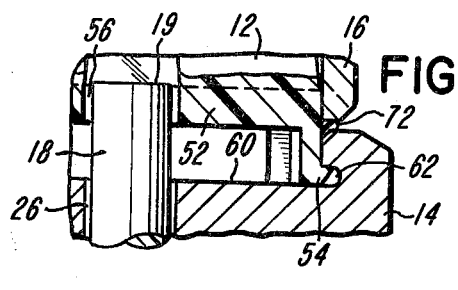

FIG-6
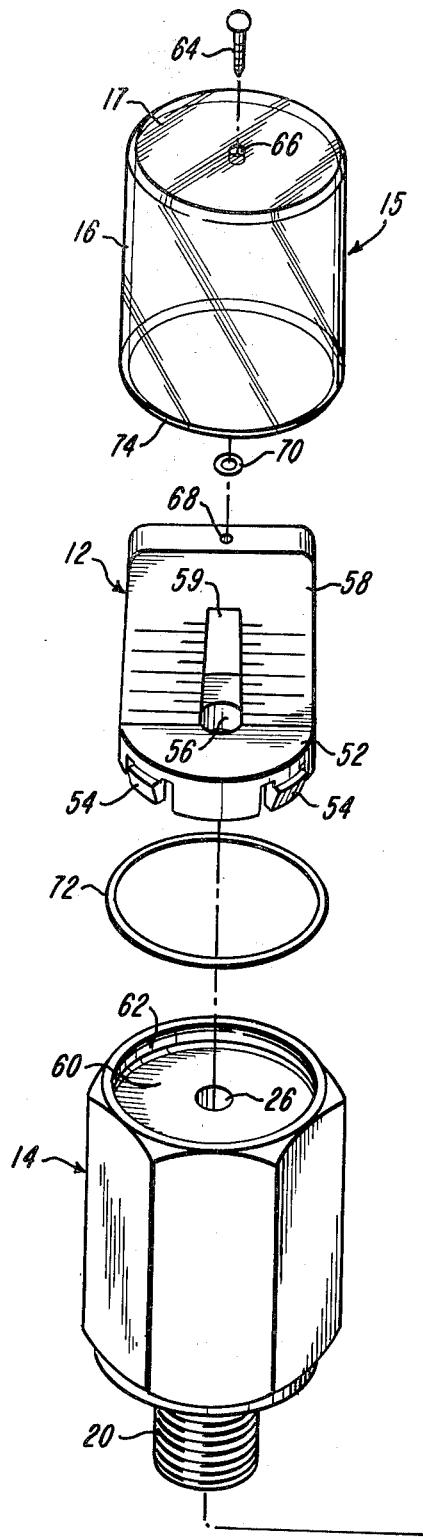
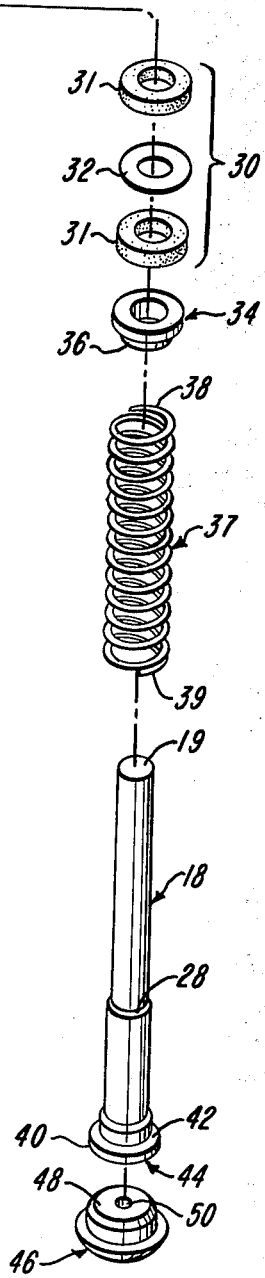

PRESSURE GAUGE HAVING INTERCHANGEABLE INDICATOR COMPONENTS AND POSITIVE PISTON STOP

BACKGROUND OF THE INVENTION

1. Field of the Invention

The present invention is generally related to pressure gauges for measuring the gauge pressure of a fluid-flow system, and more particularly to that group of pressure gauges wherein an elongate body member includes an axial bore therethrough for housing a slidable piston which is normally urged toward a fully retracted position by a compression spring or the like. Generally, one end of the piston is adapted to extend beyond the body member when the piston is in an advanced position due to the force of a fluid under pressure acting on the other end thereof.

2. Description of the Prior Art

Pressure gauges of the prior art differ from the present invention in that once assembled the piston and spring assembly cannot be removed from the bore in the body member without the use of special tools, in some cases resulting in the destruction of the body member. An example of such a pressure gauge is illustrated in U.S. Pat. No. 3,596,521, wherein a shoulder is provided at one end of the bore by an insert which is maintained in proper relationship with the body member by rolling a portion thereof downwardly over the insert. Once assembled, the piston and spring assembly is permanently housed within the body member, and cannot be removed therefrom without possible destruction of the body member when unrolling the rolled end portion thereof. Further, the piston can force the insert out of the body member when the pressure gauge is subjected to abnormally high pressures in excess of the securing force provided by the rolled-down end portion of the body member.

The present invention differs from this device in that the piston, spring and other components normally housed within the bore of the pressure gauge are securely though releasably maintained therein by use of a plug in snug, slip-fit relationship with the end of the bore which is in communication with the source of pressure to be measured.

SUMMARY OF THE INVENTION

The pressure gauge of the present invention includes an elongate body member having a bore extending axially therethrough, wherein a portion of the bore is of reduced diameter defining a shoulder in the bore spaced inwardly from the upper end thereof. A piston is slidably mounted within the bore for movement between a fully retracted position at the lower end thereof to a plurality of advanced positions wherein one end of the piston projects beyond the body member at the upper end of the bore. The piston generally includes a shoulder intermediate the length thereof and an outwardly projecting flange or lip at the lower end, providing an upper, substantially flat, annular face and a lower, substantially flat end-face. A self-lubricating sealing member is placed within the bore and is in abutting relationship with the shoulder thereof. The seal is in circumscribing contacting relationship with the periphery of the piston, providing a fluid-tight sealing relationship between the piston and the body member.

A spring keeper is placed within the bore and in abutting relationship with the sealing member, having an annular face adapted to abut the shoulder of the piston, limiting advancement thereof relative to the body member. A compression spring housed within the bore has opposite ends which abut the spring keeper and the upper annular face of the piston for normally urging the piston to a fully retracted position.

The various components of the gauge which are housed within the bore are securely though releasably maintained therein by a plug inserted in the lower end of the bore and in snug, slip-fit relationship therewith. The plug includes an axial aperture therethrough in open communication with the interior of the bore at the lower end thereof to permit access to a souce of fluid under pressure to be measured.

One form of the present invention provides for an indicator including a calibrated scale which extends longitudinally outward from the upper end of the body member. The upper end of the body member terminates in a transverse end-face which is circumscribed by a continuous, annular, tab-receptive groove. Axially projecting lock tabs depend from a base portion of the indicator and are maintained in a snap-detended relationship with the groove for securing the indicator to the body member. A transparent housing is secured to, carried by and substantially encases the indicator and where desired, sealing means may be interposed between the body member, the indicator and the transparent housing to effect a fluid-tight sealing relationship therebetween.

It is, therefore, an object of the present invention to provide a pressure gauge of the type having a body member with an axial bore carrying a piston which is normally urged toward a fully retracted position by a compression spring, wherein the compression spring, piston and various components housed within the bore are interchangeable.

It is further an object of the invention to provide a positive piston stop for limiting movement of the piston relative to the gauge body.

Other objects and features of the invention will be readily apparent from the following drawings and description.

BRIEF DESCRIPTION OF THE DRAWINGS

FIG. 1 is a perspective view of the assembled pressure gauge.

FIG. 2 is a sectional view of the pressure gauge of FIG. 1, illustrating the piston in a fully retracted position.

FIG. 3. is a view similar to FIG. 2, illustrating the piston in an advanced position.

FIG. 4 is a view taken along line 4—4 of FIG. 2, illustrating in detail the relationship between the gauge body and the indicator.

FIG. 5 is a view taken along line 5—5 of FIG. 4, enlarged for clarity of detail and understanding, illustrating means for securing the indicator to the gauge body.

FIG. 6 is an exploded view of the pressure gauge of FIG. 1, illustrating the relationship between the various components thereof.

DESCRIPTION OF THE PREFERRED EMBODIMENT

The pressure gauge of the present invention, illustrated in FIG. 1 and denoted generally by the reference numeral 10, comprises an elongate body 14 terminating in threaded end-portion 20 which provides suitable means for connnecting the pressure gauge to a source of fluid under pressure. While the body illustrated is of hexagonal cross section, facilitating the use of a wrench or similar implement in conjunction therewith, it should be understood that various other configurations are equally adaptable for use with the pressure gauge of the present invention. Calibrated indicator 12 is securely though releasably mounted on the upper end of the body and projects longitudinally outward therefrom. Transparent housing 15 encases the indicator, providing a substantially dust-free and fluid-tight chamber therefor. Central bore 22, see FIG. 2, extends axially through the body member, and is adapted to house a slidable piston 18 having end 19 projecting through upper end 26 thereof. End 19 of the piston is advanced into the indicator in response to the introduction of pressurized fluid into the opposite end 21 of the bore.

End 26 of the bore is of reduced diameter, defining shoulder 24 spaced inwardly from the upper end of the body member. Self-lubricating sealing means 30 (see FIG. 6) is inserted in the bore in abutting relationship with shoulder 24 and is in circumscribing, contacting relationship with the periphery of piston 18 to form a fluid-tight seal between the piston and the body member. While the self-lubricating sealing means generally comprises a pair of lubricant-saturated, porous, metallic bushings 31 on either side of a resilient sealing member 32, such as, by way of example, a neoprene O-ring, or the like, it should be understood that other sealing means are equally well suited for use with the present invention.

Spring keeper 34 is inserted in the bore in abutting relationship with the exposed face of one of the bushings, and provides a seat for end 38 of compression spring 37. Opposite end 39 of the spring is seated on face 42 of flange or lip 40 of the piston, normally urging the piston toward a fully retracted position near end 21 of the bore.

Shoulder 28 is included intermediate the length of the piston, and is of a diameter larger than the opening of reduced portion 26 of the bore, precluding passage of shoulder 28 therethrough. This provides a positive stop for limiting the advancement of the piston, even in the event the pressure of the fluid entering end 21 of the bore is in excess of the highest pressure to which the gauge is normally subjected. By utilizing the configuration as here illustrated, wherein shoulder 24 of the bore is an integral, unitary portion of the body member, the pressure restrictions of the gauge are substantially improved over prior art devices which included insert members to provide shoulders for limiting the advancement of the piston housed within the gauge body, as illustrated, for example, in the aforementioned U.S. Pat. No. 3,596,521. In the preferred embodiment, end-face 36 of spring keeper 34 provides a suitable abutment for shoulder 28, limiting the advancement of the piston.

Plug 46 is inserted in end 21 of the bore and forms a snug, slip-fit relationship therewith, wherein the force required to remove the plug from the bore is greater than the force provided by spring 37 acting on piston 18. Thus, plug 46 provides a secure though releasable closure for end 21 of the bore, retaining the various components of the gauge therein. When desired, the plug may be removed to permit access to the interior of the bore, ensuring interchangeability of the piston, spring and various other components housed therein. Central aperture 50 in plug 46 is in open communication with the interior of the bore, providing for entry of fluid into the bore, as indicated by arrow "P" in FIG. 3. Thus, as the pressure increases in the bore, piston 18 is advanced against the force of spring 37 and end 19 of the piston projects outwardly from end 26 of the bore and into indicator 12. The flat, inner end-face 48 of the plug, see FIG. 6, provides a positive stop for limiting movement of the piston by providing an abutment face for end 44 thereof, and thereby defines a fully retracted position of the piston relative to the body member. It should be understood that various other releasable closing means could be utilized to securely retain the various components of the gauge within the bore, plug 46 being utilized merely for purposes of illustration.

Indicator 12 includes a planar, calibrated scale 58 longitudinally projecting from the upper end of the body member. Scale 58 is U-shaped, providing a central clearance channel 59 permitting movement of piston 18 therein. The upper end of the body member terminates in a substantially flat, transverse end-face 60 circumscribed by continuous, annular, tab-receptive groove 62. The indicator includes transverse base portion 52 having a plurality of axially projecting lock-tabs 54 depending therefrom. The tabs are held in snap-detented relationship with groove 62, securely though releasably mounting the indicator to the body member. Central aperture 56 is provided in the base portion of the indicator to allow free passage of piston 18 therethrough. It should be understood that various other indicator devices could be utilized without departing from the purpose of the present invention.

Transparent housing 15 is secured to, carried by and substantially encases indicator 12. The housing comprises substantially cylindrical side wall 16 having a transverse end wall 17. The housing is placed over the indicator and secured thereto by drive screw 64, placed in axial hole 66 and driven in hole 68 provided in end 69 of indicator 12. Seal 70 is inserted between the housing 15 and the indicator 12, providing a sealing relationship therebetween. Seal 72 is placed in circumscribing relationship with annular flange 74 at the base of housing 15, and with seal 70, provides a substantially fluid-tight sealing relationship between indicator 12, body member 14 and housing 15.

The inter-relationship of the various components of the pressure gauge are illustrated in FIG. 6. Generally, indicator 12 is secured to body member 14 by placing tabs 54 in snap-detented relationship with groove 62. Housing 15 is then secured thereto by means of screw 64 and, where desired, seals 70 and 72 are applied. Sealing member 30 and spring keeper 34 are inserted into the bore through end 21 thereof and properly seated with respect to shoulder 24, see FIG. 2. Spring 37 is inserted in the bore and end 38 thereof is properly seated with respect to spring keeper 34. Piston 18 is then inserted into the bore with end 19 projecting through end 26 thereof. The lower end 39 of the spring is properly seated against the annular, upper face 42 provided by lip 40 of the piston. Plug 46 is then inserted in and forms a snug, slip-fit relationship with end 21 of the bore, retaining the various components of the gauge within the body member 14. When it is desirable to change the components within the bore, it is only necessary to remove plug 46 in the manner described herein in order to gain access to the interior of the bore and the various components housed therein. Indicator 15 is likewise interchangeable by simple withdrawing lock-tabs 54 from groove 62.

It should be understood that the pressure gauge of the present invention could be utilized with or without the indicator 12 and the housing 15 therefor, without departing from the scope of the present invention. Further, threaded end portion 20 provides but one example of the many well-known connecting means for securing the gauge 10 to a source of fluid pressure to be measured, and as such, is not intended to be either limiting or restrictive. While particular embodiments of the present invention have been illustrated and described in detail it should be understood that such are merely illustrative and are not intended to limit the scope of the present invention as defined by the appended claims.

What is claimed is:

1. A pressure gauge comprising:
   an elongate body member having a bore extending axially therethrough;
   a piston slidably mounted within said bore for movement between a fully retracted position and advanced positions wherein portions of the piston project beyond the body member from one end of the bore;
   a compression spring within said bore normally urging said piston to a fully retracted position;
   means securely though releasably closing the other end of said bore for retaining the piston and spring within the bore, said means having a passageway therethrough in open communication with the interior of the bore at said other end thereof;
   that end of the body member adjacent the said one end of the bore terminating in a transverse end-face circumscribed by a continuous, annular, tab-receptive groove;
   a calibrated indicator securely though releasably mounted on said body member at said end face and projecting longitudinally outward from said one end of the bore; and
   said indicator including a base portion having a plurality of resilient, axially projecting lock-tabs in snap-detented relationship with said groove for mounting the indicator to the body member.

2. A pressure gauge as called for in claim 1, wherein said last mentioned means comprises a plug having an inner transverse face against which an end of the piston abuts when in a fully retracted position.

3. A pressure gauge as called for in claim 2, wherein that end of the piston which abuts the plug terminates in an outwardly projecting flange having an upper, spring-abutment face and a lower, substantially flat, transverse end-face.

4. A pressure gauge as called for in claim 3, wherein a portion of the bore is of reduced diameter defining a shoulder therein spaced inwardly from the said one end thereof; a self-lubricating sealing member within the bore in abutting relationship with the periphery of the piston, providing a fluid-tight seal between the piston and body member; a spring keeper within the bore in abutting relationship with said sealing member, opposite ends of said spring abutting against the keeper and the spring abutment face of the piston, respectively, urging the piston to a fully retracted position.

5. A pressure gauge as called for in claim 4, wherein the piston includes a shoulder intermediate its length adapted to abut the spring keeper for limiting the fully advanced position of the piston relative to the body member.

6. A pressure gauge as called for in claim 1, including a transparent housing secured to, carried by and substantially encasing the indicator.

7. A pressure gauge as called for in claim 6, including sealing means interposed between the body member, the indicator and the housing to effect a fluid-tight sealing relationship therebetween.

8. A pressure gauge comprising:
   an elongate body member having a bore extending axially therethrough, a portion of said bore being of reduced diameter, defining a shoulder in said bore spaced inwardly from one end thereof;
   a piston slidably mounted within said bore for movement between a fully retracted position and advanced positions wherein one end of the piston projects beyond the body member from said one end of the bore, said piston including a shoulder intermediate the length thereof, and an outwardly projecting flange at the other end thereof having an upper, substantially flat, annular face and a lower, substantially flat end-face;
   a self-lubricating sealing member within the bore in abutting relationship with said shoulder and in circumscribing contacting relationship with the periphery of said piston, providing a fluid-tight seal between the piston and the body member;
   a spring keeper within the bore and in abutting relationship with said sealing member, including an annular face adapted to abut the shoulder of the piston, limiting advancement thereof relative to the body member;
   a compression spring within said bore, opposite ends of which abut the spring keeper and the upper, annular face of the piston for normally urging said piston to a fully retracted position;
   a plug in snug, slip-fit relationship with the said other end of the bore, securely though releasably closing said other end of the bore for retaining the piston, the spring and keeper, and the sealing member within said bore, the inner end of said plug terminating in a transverse face against which the flat end-face of the piston abuts when in a fully retracted position, the plug including an axial aperture therethrough in open communication with the interior of the bore at the said other end thereof;
   the end of the body member adjacent the said one end of the bore terminating in a transverse end-face circumscribed by a continuous, annular tab-receptive groove;
   a calibrated indicator projecting longitudinally outward from the said one end of the bore, the indicating means including a base portion having a plurality of resilient, axially projecting lock tabs in snap-detented relationship with said groove for mounting the indicator to the body member;
   a transparent housing secured to, carried by and substantially encasing said indicator; and
   sealing means interposed between the body member, the indicator and the transparent housing to effect a fluid-tight sealing relationship therebetween.

* * * * *